Aug. 17, 1926.

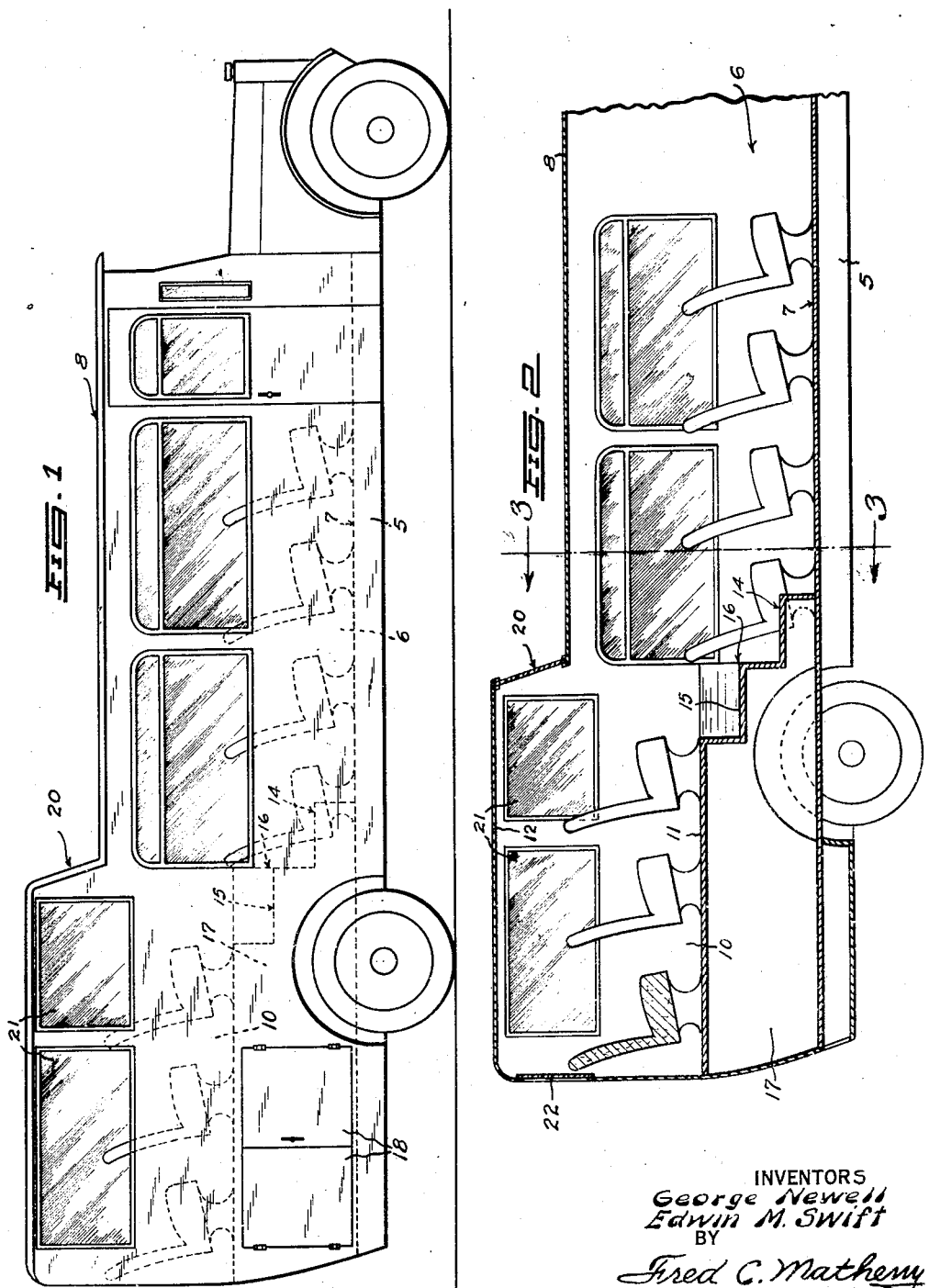

G. NEWELL ET AL 1,596,212

PASSENGER COACH

Filed Sept. 17, 1925    2 Sheets-Sheet 2

INVENTOR
George Newell
Edwin M. Swift
BY
Fred C. Matheny
ATTORNEY

Patented Aug. 17, 1926.

1,596,212

UNITED STATES PATENT OFFICE.

GEORGE NEWELL, OF EVERETT, AND EDWIN M. SWIFT, OF SEATTLE, WASHINGTON.

PASSENGER COACH.

Application filed September 17, 1925. Serial No. 56,818.

Our invention relates to improvements in bodies for passenger coaches and the object of our invention is to provide a passenger coach having toward the front end the usual main passenger compartment and at the rear end, a passenger compartment that is elevated above said main compartment to afford a baggage compartment therebelow and to make possible the provision of an observation window or windshield at the front of said elevated rear compartment and above the level of the roof of said main compartment.

Another object is to provide, in a passenger coach, an elevated smoking compartment that may be in open communication with the main compartment without permitting any substantial amount of smoke to enter the main compartment.

Other and more specific objects will be apparent from the following description taken in connection with the accompanying drawings.

In the drawings Figure 1 is a view in side elevation of a passenger coach constructed in accordance with our invention.

Fig. 2 is a view in longitudinal mid section of the same.

Like reference numerals designate like parts throughout the several views.

Figure 3:
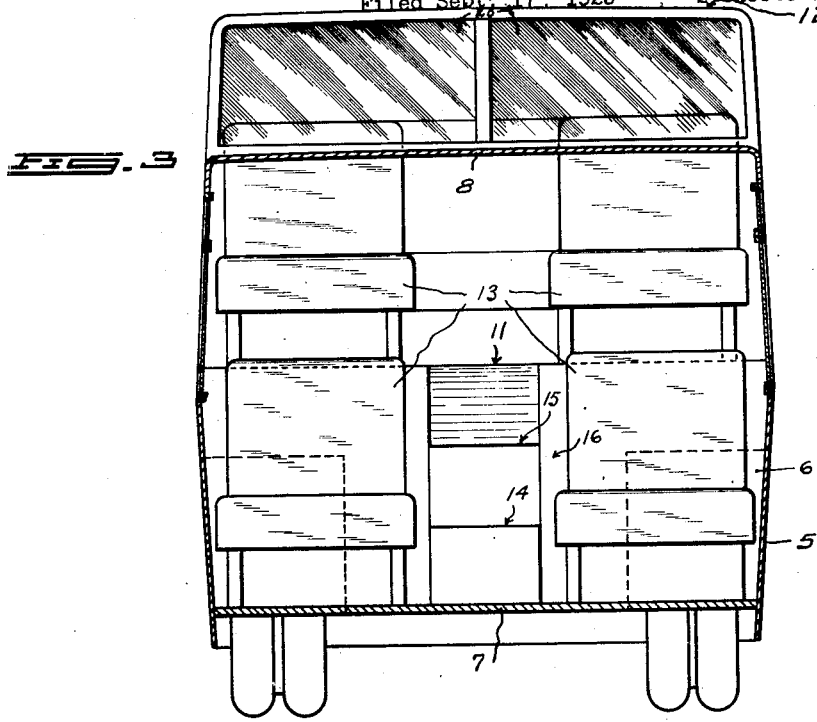
Figure 3 is a view in cross section of the same on a larger scale substantially on broken line 3—3 of Fig. 2.
Figure 4:
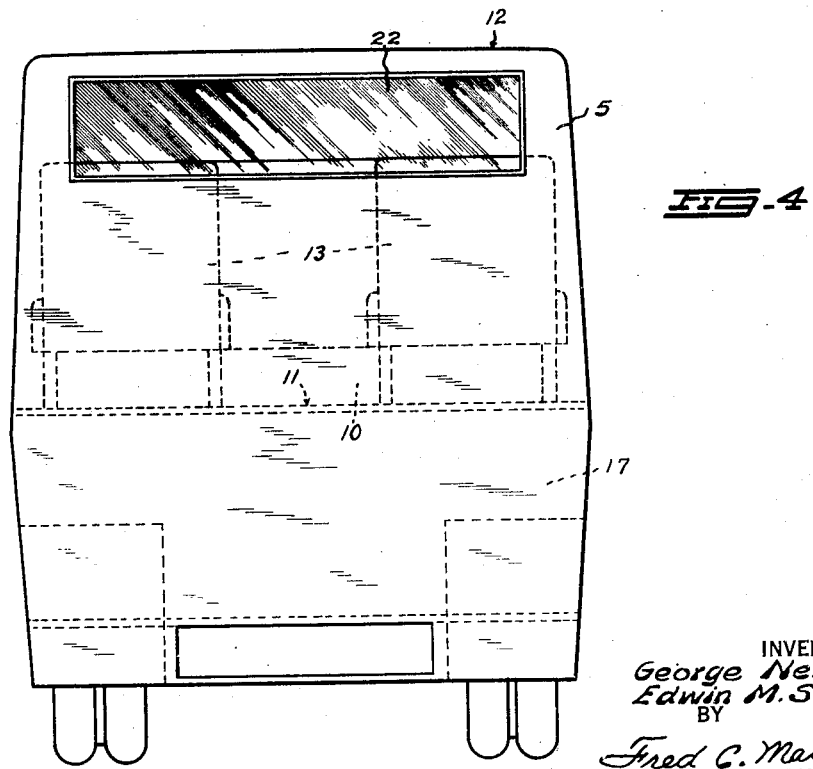
Fig. 4 is a view in rear elevation of the coach.

This passenger coach is designed especially for use on motor busses but may be used on rail vehicles if desired.

The extensive use of motor busses for transporting passengers has created a demand for passenger coaches or bodies for said busses that will afford a maximum seating capacity for passengers; that will afford the best possible observation facilities for the passengers; that will afford smoking compartment facilities and that will enable the bus driver to care for the baggage of the passengers.

The problem of taking care of the baggage presents grave difficulties that are overcome in our present construction in such a manner as to add to, rather than detract from the desirable features of a passenger coach. Heretofore it has been customary to carry the baggage on the top or roof of the coach where it is difficult of access, is liable to fall off and tends to make the vehicle top heavy, or to carry such baggage in boxes or receptacles secured to the rear of the coach body, which arrangement has proved to be unsatisfactory for the reason that the receptacles are unsightly and are in the way. The present invention obviates these difficulties and at the same time affords a very desirable passenger compartment which may be used as an observation or as a smoking compartment, or both, and which affords a view to the front of the vehicle through a window located above the top of the main passenger compartment.

In the drawings 5 designates a vehicle body having a forward compartment 6 provided with a floor 7 and a roof 8 and having a rear compartment 10 located above said forward compartment and provided with a floor 11 and a roof 12 elevated above the respective floor and roof of the forward compartment 6.

Seats 13 are provided along each side of each compartment to leave an aisle therebetween and steps 14 and 15 are provided in said aisle at the junction of said two compartments, the lower step 14 preferably being forward of the wall 16 that forms the rear end of the forward compartment and the upper steps 15 being recessed within the floor 11 of the rear compartment so that a person may step directly from said upper step into the aisle of the rear compartment or may step sidewise from said upper step onto the floor in front of the foremost seat at either side of the rear compartment.

The floor 11 of the rear compartment is preferably elevated to a level approximately half way between the floor and roof of the forward compartment and the floor 7 of the forward compartment is allowed to extend to the rear end of the coach body thus forming between said two floors 7 and 11 a relatively large and spacious baggage compartment 17 to which access may be had through doors 18. The floor 7 is necessarily cut away to provide room for wheel housings and for the necessary mechanical working parts of the truck chassis on which the coach body is mounted.

The roof 12 of the rear compartment is elevated above the roof 8 of the main compartment sufficient for clearance or head room for the passenger and sufficient to afford, at the forward end of said roof an observation window or windshield 20 through which the passengers in the seats of the rear compartment may obtain a clear view out over the roof 8 to the front of the vehicle. Side windows 21 and rear windows 22 are also provided in the rear compartment 10. The front observation window is an important feature of the invention as it adds greatly to the enjoyment of the passengers by increasing their range of vision and making it possible for them to see out in every direction.

The elevation of the rear compartment floor 11 raises the eyes of the passengers who occupy the rear seats high enough so that they can readily see out of the front observation window 20.

When the rear compartment is used for a smoking room the fact that it is higher than the forward compartment will ordinarily prevent any substantial amount of the smoke from entering the forward compartment thus obviating the necessity of separating the two compartments by a partition as is ordinarily done thereby tending to lessen the weight and to economize on the cost of construction of the passenger coach. The windows 21 of the rear compartment are preferably arranged to be lowered and, if desired, ventilators may be provided in the roof 12.

The baggage compartment 17 is low and readily accessible and the weight of the baggage therein tends to lower the center of gravity of the truck body and offset the effect of elevating the passengers in the rear compartment.

The foregoing description and accompanying drawings clearly disclose a preferred embodiment of our invention but it will be understood that this disclosure is merely illustrative and that such changes in the invention may be resorted to as are within the scope and spirit of the following claims.

We claim:—

1. In a passenger coach, a body having a main passenger compartment located toward the forward end and another passenger compartment located toward the rear end and communicating with said main compartment, the floor of said rear compartment being elevated substantially midway between the floor and ceiling of said main passenger compartment, and said body having a baggage receptacle formed below said floor of said rear passenger compartment.

2. In a passenger coach, a body having a lower passenger compartment located toward the forward end and a higher passenger compartment located toward the rear end, the floor of said rear compartment being in a plane substantially mid way between the floor and roof of said forward compartment to form a baggage receptacle therebelow and the roof of said rear compartment being above the roof of said forward compartment, an observation window in the front of said rear compartment overlooking the roof of said forward compartment, seats in said compartments leaving a central aisle and steps in said aisle for ascending to said rear compartment.

GEORGE NEWELL.
EDWIN M. SWIFT.